United States Patent [19]

Härdtl et al.

[11] 3,853,973
[45] Dec. 10, 1974

[54] ISOSTATIC HOT-PRESSING PROCESS FOR MANUFACTURING DENSE SINTERED ARTICLES

[75] Inventors: Karl Heinz Härdtl; Heinrich Knüfer, both of Aachen, Germany; Andreas Leopoldus Stuijts, Emmasingel, Eindhoven, Netherlands

[73] Assignee: U.S. Philips Corporation, New York, N.Y.

[22] Filed: Dec. 21, 1972

[21] Appl. No.: 317,427

[30] Foreign Application Priority Data
Dec. 22, 1971   Germany............................ 2163889

[52] U.S. Cl. ................................................ 264/65
[51] Int. Cl. ............................................... F27b 9/04
[58] Field of Search............. 264/322, DIG. 58, 313, 264/66, 65

[56]         References Cited
         UNITED STATES PATENTS
3,383,737   5/1968   Greger............................. 264/332
3,455,682   7/1969   Barbaras........................... 264/313
3,458,927   8/1969   Wiechec....................... 264/DIG. 58
3,469,976   9/1969   Iler.................................. 264/332
3,562,371   2/1971   Bush................................ 264/332
3,606,286   9/1971   Lundstrom......................... 264/332
3,622,313   11/1971  Havel............................... 264/332
3,725,094   4/1973   Levy et al............................ 264/66

*Primary Examiner*—Robert F. White
*Assistant Examiner*—James R. Hall
*Attorney, Agent, or Firm*—Frank R. Trifari; Carl P. Steinhauser

[57]             ABSTRACT

A method of making highly-dense polycrystalline bodies, e.g., video recording heads by sintering in an inert gas atmosphere having a pressure greater than atmospheric, i.e., 25 to 30 kg/cm² at the sintering temperature.

5 Claims, 3 Drawing Figures

ISOSTATIC HOT-PRESSING PROCESS FOR MANUFACTURING DENSE SINTERED ARTICLES

The invention relates to an isostatic hot-pressing process for manufacturing dense sintered products and particularly articles of ceramic material, of which articles of piezo-electric, ferroelectric or ferromagnetic as well as of transparent ceramic material for optical purposes are of particular importance.

For given uses of sintered products of this kind materials without pores are required. Examples of these uses are: transparent ferroelectric or para-electric ceramic materials for electro-optical purposes, piezo-electric ceramic materials for surface wave filters, ferromagnetic ceramic materials for magnetic heads and for microwave uses and transparent ceramic materials for envelopes of lamps.

Especially when using, for example, lithium-zinc ferrites (formula $(Li_{0.5}Fe_{0.5})_{1-x}Zn_xFe_2O_4$) in which $x$ may vary between 0.2 and 0.7) in the microwave range for circulators and waveguide phase shifters the porosity of the ferrites must be very low because the demagnetizing fields of the pores disturb the required homogeneity of the magnetic field in the ferrite.

When using ferrites as a material for magnetic heads for magnetic recording and playback it has been found that the wear resistance of the heads is quite adversely affected by the presence of pores. The presence of pores is not only detrimental with respect to the wear resistance but also with respect to the manufacture of the magnetic heads for which mechanical operations in the form of sawing, milling grinding and polishing are used. Particularly for the operation with a saw or a cutter crystallites may be torn loose when pores are present in the material.

It will be evident that for the said uses the availability of ferrites without pores is very important.

An object of the invention is to provide a method of manufacturing sintered bodies substantially without pores and particularly bodies consisting of ferrites.

It has already been attempted in different manners to manufacture sintered bodies having very few pores. Philips Technical Review, Volume 29, Nr. 2, pages 45 – 53 (1968) describes a (non-isostatic) continuous hot-pressing process for manufacturing ferrites in which the aim is to manufacture bodies of low porosity.

Furthermore methods of manufacturing an isostatically hot-pressed article are known. In the known methods a reservoir is filled with the powder from which the article is to be manufactured; subsequently the reservoir is evacuated and hermetically closed whereafter it is heated to a high temperature, the reservoir being deformed and the powder being compressed and sintered.

German Auslegeschrift 1,901,766 describes a method of manufacturing isostatically hot-pressed articles from powders of metals or of inorganic non-metallic compounds in which a reservoir of glass is filled with the powder at a pressure below normal pressure, hermetically closed and heated under pressure to a temperature at which the reservoir softens and the powder is compressed and sintered. Subsequently the reservoir with the contents are cooled and the glass reservoir is removed from the pressed body.

The known isostatic methods have the drawback that the powder to be compressed is introduced into a separate reservoir to be evacuated, which reservoir is to be detached from the compressed body after isostatic hot-pressing.

The invention provides a method in which these operating stages are omitted, thus obviating the said drawback. Consequently the embodiment of the method according to the invention is technically much simpler than the known methods.

The sintered bodies which are manufactured in accordance with the known methods, thus without using pressure, exhibit a residual porosity which is generally found to be detrimental, especially for given uses.

The invention furthermore provides a method of manufacturing sintered bodies without a noticeable residual porosity.

Furthermore the known hot-pressing processes sometimes have the drawback that articles of an arbitrary complicated shape cannot be made or can only be made with great difficulty.

The invention provides a method in which this drawback does not occur.

When using the conventional sintering methods of manufacturing ceramic articles in which sintering is effected without using pressure, articles are obtained whose density is 90 to more than 99 percent of the theoretical density.

The method according to the invention is also suitable for further compressing of sintered bodies consisting of ceramic material and metal (cermet).

The invention relates to an isostatic hot-pressing process for manufacturing a dense sintered product of ceramic material or of ceramic material and metal, in which a sintered product, having a closed porosity, consisting of ceramic material or of ceramic material and metal is exposed directly and on all sides to a gas pressure at the sintering temperature.

Such a process is described in U.S. Pat. No. 3,562,371. In this known process gas pressures are used of at least 700 kg/sqcm (= 700 atmosphere = 10,000 p.s.i.).

When using such high pressures equipment of special construction is to be used inter alia in connection with the safety to be taken into account. This drawback is accentuated by the fact that the equipment is used at a high temperature. In the example described in said patent a temperature of 1,650°C is used.

In the method according to the invention considerably lower gas pressures are used so that the said drawback does not occur.

It was found that sintered products having a closed porosity can be further compressed by means of isostatic hot-pressing while using a considerably lower gas pressure than that which is used in accordance with the known method when lattice defects are present in the crystals forming the polycrystalline sintered product subjected to the process.

The invention relates to a method of compressing a polycrystalline sintered body having a closed porosity in which this body is exposed at the sintering temperature directly and on all sides to an inert gas having an elevated pressure and is characterized in that a polycrystalline sintered body in the crystals of which lattice defects are present is exposed to an inert operating gas having a pressure of from 25 to 300 kg/sqcm.

The manufacture of polycrystalline sintered bodies in the crystals of which lattice defects are present may be effected in accordance with known methods.

The lattice defects may be brought about by vacancies in the crystal lattice (cation or anion vacancies) by interstitial ions; by stoichiometrical deviations; by plastic deformation or by a combination of two or more of these causes.

The lattice defects may be realized, for example, by incorporation of "alien" ions (dope) of a valence which deviates from that of the ions which normally occupy the sites of these ions.

The defects may be realized by sintering or postfiring in an atmosphere which is such that at the temperature used the sintered body takes up or gives off oxygen. They may alternatively be realized in some cases by an excess of one of the components.

In the examples mentioned hereinafter lattice defects have been realized in different manners.

In lead-titanate-zirconate by the introduction of lanthanum oxide, (examples, I, II, III, VI and VII) or by introduction of iron oxide (example IV).

In Mn-Zn ferrite (Example X) and the Ni-Zn ferrite (Example XI) by an excess of oxide of the bivalent metal.

In the further example of aluminum oxide (Example XII) by an addition of magnesium oxide. In barium titanate (Example V) by an excess of titanium.

The method according to the invention serves for further compressing sintered bodies consisting of ceramic material or of ceramic material and metal which may be manufactured by known methods and in which the pores present in the bodies do not have a direct connection with the surfaces of the bodies; these sintered bodies exhibit a so-called "closed" porosity. In the sintered bodies of ceramic material or of ceramic material and metal manufactured by the known methods this is the case for substantially all pores if the density is more than 90 percent of the theoretical density. The method according to the invention may be successfully used for such sintered bodies.

In the known isostatic hot-pressing processes the material to be sintered is introduced into a reservoir which consists of, for example, glass or rubber (see German Offenlegungsschrift 1,449,403) whereafter the receiver is closed and evacuated. Subsequently the reservoir with the contents is heated to the sintering temperature and the reservoir is exposed to a hydrostatic pressure.

In the method according to the invention the sintered body to be further compressed is not introduced in a separate reservoir but is directly exposed to a gas pressure (at the sintering temperature).

A great advantage of the method according to the invention is then obtained: by exerting a gas pressure on all sides of the sintered bodies such bodies of any arbitrary shape can be further compressed.

Generally an inert gas is used as an operating gas. In some cases a gas mixture is used in which one component cannot be considered as an inert gas. This is, for example, the case when for further compressing of ferrite bodies a given partial oxygen pressure is required so as to maintain the desired oxygen content of the ferrite at the required level.

Suitable inert gases are, for example, rare gases such as argon and furthermore, for example, nitrogen is a suitable gas.

An inert gas in the sense of the invention is considered to be a gas which does not influence the chemical composition of the sintered body when the method is carried out.

It has been found that when using the method according to the invention a considerably further compression can be effected at temperatures which are lower than the temperatures at which sintering occurs in the known sintering methods and in which the articles to be sintered are not exposed to an external pressure. In the method according to the invention the "sintering temperature" is also understood to mean the temperatures at which in accordance with this method a further compression of the articles subjected to this process is effected and in which in accordance with the known methods no or substantially no sintering would occur without using an external pressure.

It is assumed that when further compressing the sintered bodies subjected to the process according to the invention a renewed sintering is effected even in those cases where the temperature at which the method is carried out is lower than the commonly used sintering temperature. Furthermore it is assumed that this becomes possible because the pressure used enhances sintering and particularly because in the method according to the invention the use of pressure is considered to be ideal from an isostatic point of view.

In the known isostatic methods in which the body to be compressed is present in a reservoir on which an isostatic pressure is exerted, the exertion of isostatic pressure on the body to be compressed is only approximated.

The pores of the sintered bodies to be further compressed by the method according to the invention may be filled with different gases.

It may be assumed that in piezo-electric ceramic sintered bodies having a perowskite structure which are manufactured in accordance with known methods by sintering in an oxygen atmosphere such as bodies of lead-zirconate-titanate the pores are filled with oxygen. Since in such materials the $O_2$ diffusion is large at the sintering temperature, it may be assumed that when performing the method according to the invention the oxygen diffuses out through the material.

However, it has been found that for performing successfully the method according to the invention it is not necessary that the gas present in the pores of the sintered body to be further compressed can diffuse through the material of the body.

In both cases sintered bodies may be compressed to an equal extent. It is assumed that in those cases where the gas present in the pores cannot diffuse out, the gas is compressed to the pressure of the operating gas in case of reduction of the pore volume.

The invention will hereinafter be described in detail with reference to some embodiments.

Figure 1:
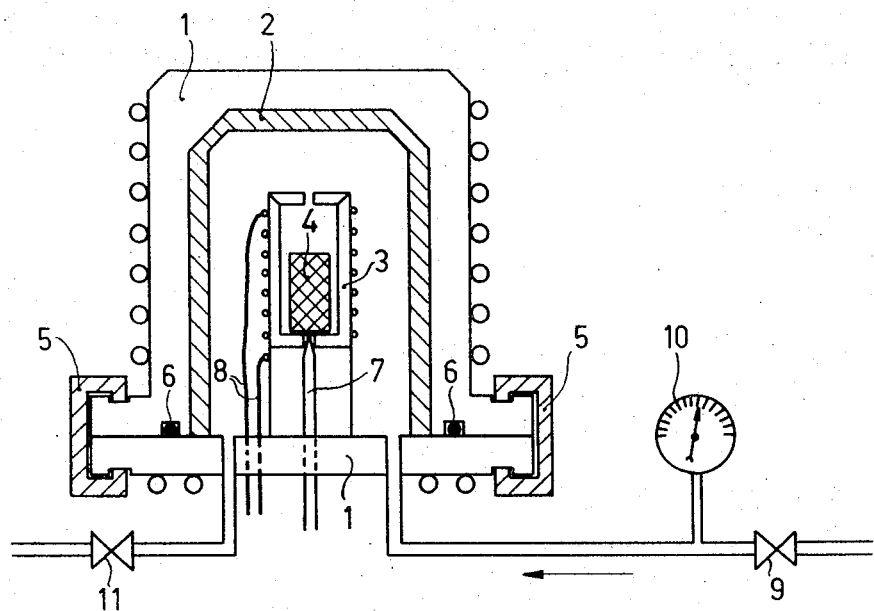
FIG. 1 shows a device for carrying out the method according to the invention.

FIG. 1 diagrammatically shows the equipment used for the experiments which have led to the invention. In this FIG. 1 denotes a water-cooled cylindrical steel autoclave which is suitable for a maximum pressure of 200 atm. 2 denotes the heat insulation and 3 denotes a resistance heating furnace while 4 denotes the ceramic body to be compressed, 5 denotes the chuck (a total of 14 in a circle), 6 denotes the seal, 7 denotes a thermal element for the temperature control of the furnace 3, 8 denotes an insulated thermal element and heating supply ducts, 9 denotes a gas inlet valve (for admitting the operating gas), 10 denotes a manometer and 11 denotes a gas outlet valve.

It has been found that no particularly strict requirements are imposed on the purity of the operating gases (for example, nitrogen or argon).

Some experiments and their results will be described hereinafter. For this purpose test bodies were used which were manufactured in accordance with known sintering processes. These bodies were compressed by means of the methods according to the invention. For example, test bodies of the composition $Pb_{0.8875}La_{0.075}$ $(Ti_{0.35}Zr_{0.65})O_3$ were obtained in conventional manner by sintering in an $O_2$ atmosphere for 4 hours at 1,250°C. These test bodies had a density of $7.68 \pm 0.01$ g/ccm. The theoretical density was to be between 7.79 and 7.82 g/ccm dependent on the vacancy distribution. Prismatic bodies having approximately the dimensions of 16mm × 5 mm × 5 mm were formed from the test bodies.

After an isostatic hot-pressing process according to the invention at 1,250°C in 200 atm of $N_2$ gas as an operating gas the density had increased to 7.78 g/ccm and for an isostatic hot-pressing process according to the invention with 200 atm of argon as an operating gas it had increased to 7.81 g/ccm.

Figure 2:
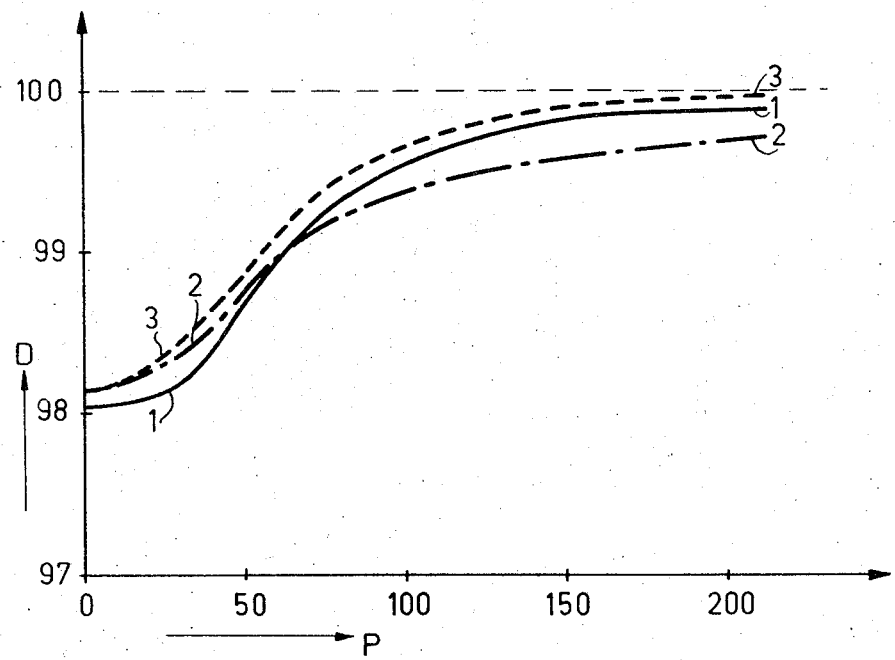
FIG. 2 is a graph showing the relationship of pressure and density.

FIG. 2 shows the increase in density (D) in per cents of the theoretical density when using the method according to the invention as a function of the pressure (P) of the operating gas $N_2$ in atmospheres for two different ceramic materials.

Curve 1 shows the increase in density for a barium titanate (formula $Ba_{1.0}Ti_{1.005}O_3$) test body having an initial density of 98.1 percent of the theoretical density at an operating temperature of 1,250°C and a duration of 1 hour. The test bodies 2 and 3 consist of $Pb_{0.8875}La_{0.075}$-$(Ti_{0.46}Zr_{0.54})O_3$ having an initial density of 98.2 percent of the theoretical density. For curve 2 the operating temperature was 1,100°C and for curve 3 it was 1,150°C. The compression duration was half an hour for each of the test bodies 2 and 3.

These examples show that pressure between 100 and 200 atm. ensure an optimum compression. A further increase of the pressure of the operating gas to more than 200 atm. is not harmful for the method according to the invention but does not yield important advantages with respect to a further compression of the articles (bodies) to be compressed.

As FIG. 2 shows a noticeable compression starts at pressures of 25 atm. and 50 atm. A comparison between curves 2 and 3 in FIG. 2 shows that the pressures which lead to a noticeable compression are lower as the sintering temperature is higher. For this reason a noticeable compression already starts at an operating gas pressure of 10 atm. in case of a further increase of the sintering temperature.

Tables 1 and 2 show some results of tests with sintered bodies of ferro-electric material having the perowskite structure of the mentioned compositions obtained by using nitrogen or argon as an operating gas. The sintered bodies were manufactured in known manner by sintering in an oxygen atmosphere.

TABLE 1

| A | B | C | Operating gas $N_2$ | | | G | H |
| | | | D | E | F | | |
|---|---|---|---|---|---|---|---|
| I   | 200 | 0,5  | 1220 | 7,57 | 7,68 | 1,45 | 7,64–7,69 |
| II  | 200 | 0,67 | 1170 | 7,63 | 7,72 | 1,18 | 7,71–7,74 |
| III | 200 | 0,5  | 1250 | 7,68 | 7,79 | 1,43 | 7,79–7,82 |
| IV  | 200 | 5    | 1250 | 7,95 | 8,01 | 0,75 | 8,0 |
| V   | 200 | 2    | 1250 | 5,87 | 6,00 | 2,21 | 6,02 |

TABLE 2

| A | B | C | Operating gas argon | | | G | H |
| | | | D | E | F | | |
|---|---|---|---|---|---|---|---|
| VI  | 200 | 0.5 | 1220 | 7.57 | 7.67 | 1.32 | 7.64–7.69 |
| VII | 200 | 0.5 | 1250 | 7.67 | 7.81 | 1.83 | 7.79–7.82 |

In these tables:

A. = number of test
B. = pressure of operating gas in atmospheres
C. = time in hours
D. = temperature in °C
E. = initial density in g/ccm ⎫ determined with the aid of
F. = ultimate density in g/ccm ⎬ hydrogen static scales
G. = density increase in %
H. = theoretical density.

These characters have the same significance in tables 1 to 4 inclusive.

The composition of the sintered bodies was as follows:

| I and VI:   | $Pb_{0.79}La_{0.14}(Ti_{0.35}Zr_{0.65})O_3$ |
| II:         | $Pb_{0.835}La_{0.11}(Ti_{0.35}Zr_{0.65})O_3$ |
| III and VII:| $Pb_{0.8875}La_{0.075}(Ti_{0.35}Zr_{0.65})O_3$ |
| IV:         | $Pb(Ti_{0.4}Zr_{0.6})_{0.985}Fe_{0.015}O_3$ |
| V:          | $Ba_{1.0}Ti_{1.005}O_3$. |

The two tables show (compare the values in columns F and H) that when using the method according to the invention the theoretical density is substantially achieved.

For the purpose of comparison sintered body composed of piezo-electric perowskite material obtained by sintering in a nitrogen atmosphere in accordance with the known method was further compressed with the aid of the method according to the invention using 200 atm of $N_2$ as an operating gas. Test bodies of the composition $Pb_{0.835}La_{0.11}(Ti_{0.35}Zr_{0.65})O_3$ which were sintered in the conventional manner for 4 hours at 1,170 °C in an $N_2$ atmosphere had a density of 7.55 g/ccm. After an isostatic hot-pressing process according to the invention with 200 atm of $N_2$ as an operating gas for 2 hours at 1,170°C the density had increased to 7.73 g/ccm as table 3 shows. In this case it is assumed that nitrogen does not diffuse out of the pores but is compressed to the operating gas pressure and that due thereto a strong reduction of the pore volume is achieved.

TABLE 3

| A | B | C | D | E | F | G | H |
|---|---|---|---|---|---|---|---|
| VIII | 200 | 2 | 1170 | 7.55 | 7.73 | 2.38 | 7.71–7.74 |

In addition to materials having a perowskite structure the following different compounds were compressed substantially to theoretical density with the aid of the isostatic hot-pressing process according to the invention:

yttrium-iron garnet (composition $Y_3Fe_5O_{12}$) as a characteristic representative of the compounds having the garnet structure (results see column IX in table 4);

Mn-Zn ferrite (composition: 52.6 percent by weight of $Fe_2O_3$, 24.5 percent by weight of MnO, 22.9 percent by weight of ZnO) (Example X) and Ni-Zn ferrite (composition: 49.7 percent by weight of $Fe_2O_3$, 18.1 percent by weight of NiO, 32.2 percent by weight of ZnO) (Example XI) as characteristic representatives of compounds having a spinel structure (results see columns X and XI of table 4).

Aluminium oxide ($Al_2O_3$) (results see column XII of table 4).

In the manufacture of the sintered alumina body alumina powder containing 0.3 percent by weight of magnesia was used.

TABLE 4

| A | B | C | D | E | F | G | H |
|---|---|---|---|---|---|---|---|
| IX | 200 | 4 | 1300 | 4.82 | 5.16 | 7.0 | 5.17 |
| X | 200 | 4.5 | 1200 | 4.94 | 5.10 | 3.24 | 5.12 |
| XI | 200 | 4 | 1200 | 5.31 | 5.33 | 0.38 | 5.33 |
| XII | 200 | 22 | 1300 | 3.93 | 3.98 | 1.27 | 3.99 |

It has been found that the removal of the residual porosity in the isostatic hot-pressing process according to the invention can be observed with the aid of light-microscopic schliff image investigations. In the test bodies sintered in accordance with the known method the residual porosity was clearly visible on the polished schliffs in the form of dark apertures. When the same test body is subjected to the isostatic hot-pressing process according to the invention the microscopic schliff image is completely without or substantially completely without pores. All this was found in all investigated test bodies.

The test bodies I, II, III, VI, VII, VIII and XII of the above-mentioned tables had a high transparency after the isostatic hot-pressing process according to the invention as compared with before this process. A test body of the composition II having a thickness of 0.7 mm exhibited absorption and dispersion losses of less than 20 percent at a lightwavelength of 0.6 um.

In the technique there are examples of materials which because of their properties are in principle very suitable for given uses but cannot be used in practice because the desired bodies of a sufficient density cannot be made with the aid of the known methods from these materials for these uses. The latter is caused in certain cases also because the design of the desired body is so complicated that such a body manufactured in accordance with a known sintering method cannot be compressed or can only be compressed with great difficulty while using a known isostatic hot-pressing process in which the body to be compressed is to be introduced into a reservoir intimately surrounding the body on all sides.

In this connection many examples might be referred to such as magnetic heads from ferrites, transformer cores from ferrites, thin apertures discs, tubular bodies of alumina for lamp envelopes. In these cases the method according to the invention may be advantageously used.

In addition to the mentioned advantages of the method according to the invention the greater dimensional stability which can be achieved with this method is an advantage worth mentioning.

In polycrystalline sintered bodies of barium titanate whose composition may be defined by the formula $Ba_{1.0}Ti_{1.005}O_3$ compression by the method according to the invention was checked at different gas pressures as a function of the sintering duration.

The lattice defects in the crystals of the polycrystalline sintered body are brought about by the excess of titanium.

In the compression process according to the invention the sintering temperature was always 1,300°C. The tests were performed at three different gas pressures namely 25, 50 and 150 atm. Nitrogen was used as an operating gas.

Figure 3:
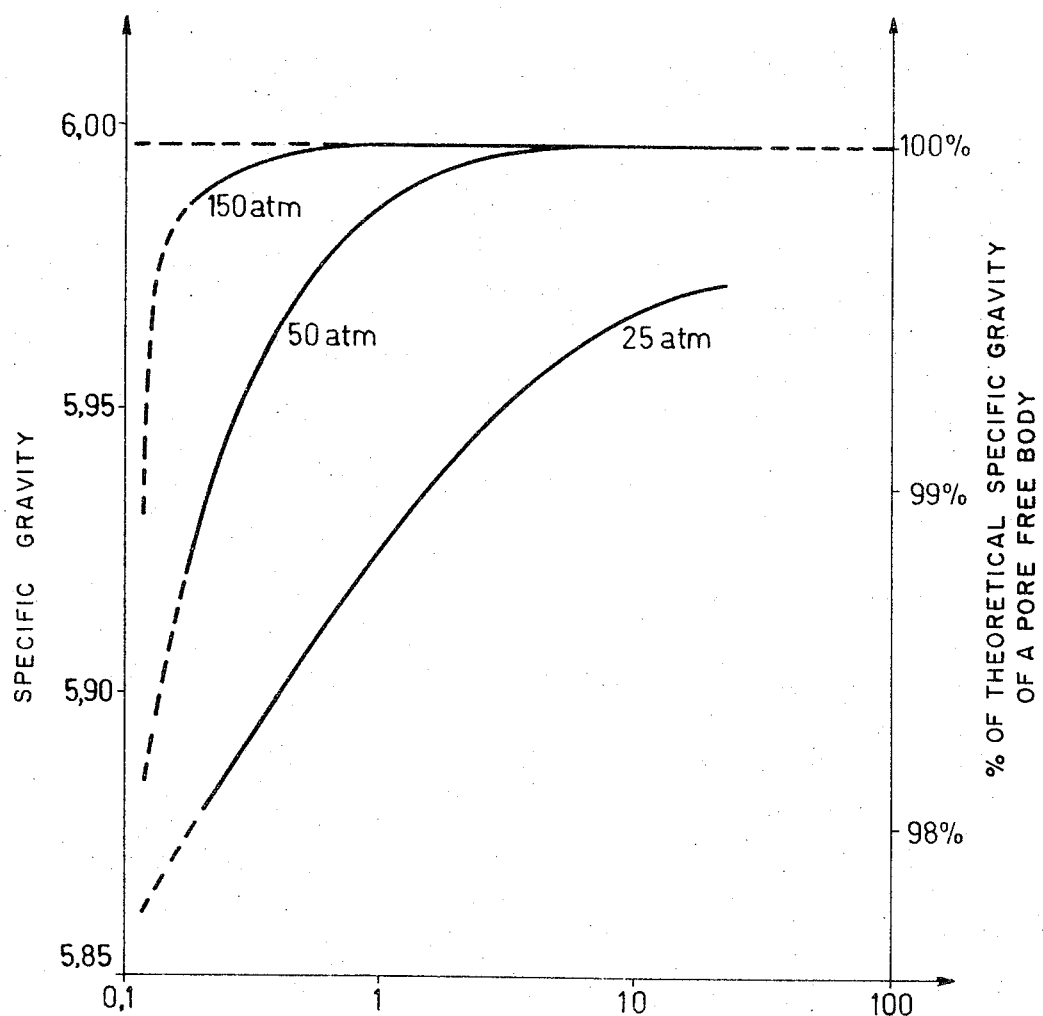
FIG. 3 is a graph showing the relationship of specific gravity and time during which the body is exposed to the gas pressure.

The results are shown in FIG. 3 of the drawing.

Vertically (to the left) the specific gravity is shown and vertically (to the right) the density in per cents of the theoretical density (=100 percent).

The compression duration (in hours, logarithmic scale) has been shown horizontally.

The Figure shows that already at a gas pressure of 25 atm (curve 25 atm) a considerable compression is obtained in more than 10 hours. At 50 atm gas pressure substantially the theoretical density is achieved within approximately 5 hours (curve 50 atm) and when using a gas pressure of 150 atm this is already the case within approximately 1 hour (curve 150 atm).

The mean grain size in the compressed bodies was approximately 2 um.

A polycrystalline sintered body of the same composition which was manufactured in a conventional manner, but which was maintained at the sintering temperature for a considerably longer time than is common practice was treated by the method according to the invention. At a sintering temperature of 1,300°C and a gas pressure of 200 atm (nitrogen) no compression was obtained after 10 hours. The mean grain size of the body was approximately 100 um. It is assumed that in case of the prolonged sintering treatment (in the conventional manner) a recrystallization causing a strong grain growth must have taken place and that the pores originally present at the grain boundaries (intergranular pores) have come within the grains (crystals) due to the strong grain growth (intragranular pores). As is known, intergranular pores can be removed during sintering processes but intergranular pores cannot. This might be an explanation of the fact that no compression was obtained in the coarse crystalline sintered body.

What is claimed is:

1. In the method of forming a polycrystalline body having a density greater than 98 percent of the theoretical density thereof in which particulate polycrystalline material is compacted and sintered to form a coherent dense body, the improvement comprising:
   a. introducing lattice defects into said particulate polycrystalline material,
   b. compacting said particulate polycrystalline material into a body, and
   c. exposing said compacted body directly and on all sides to an inert gas at a pressure of from 25 to 300kg/cm$^2$ while heating said body to a temperature of about 300°C for a time sufficient to sinter and increase the density of said body to between 98 and 100 percent of the theoretical density.

2. A method as claimed in claim 1, wherein the gas pressure is from 50 to 200 kg/sqcm.

3. A method as claimed in claim 1 wherein the polycrystalline body consists of a material selected from the group consisting of a ceramic material and cermet.

4. A method as claimed in claim 3, wherein the ceramic material is selected from the group consisting of ceramic materials whose crystals have the perowskite structure, ceramic materials whose crystals have the spinel structure, and ceramic ferrite.

5. A method as claimed in claim 4, wherein the ceramic material is ceramic ferrite and the gas has an oxygen content such that the oxygen content of the ferrite remains unchanged.

* * * * *

PO-1050 (5/69)

UNITED STATES PATENT OFFICE
CERTIFICATE OF CORRECTION

Patent No. 3,853,973  Dated December 10, 1974

Inventor(s) KARL HEINZ HARDTL ET AL

It is certified that error appears in the above-identified patent and that said Letters Patent are hereby corrected as shown below:

On the title page change the priority application number to read --2163889.1--

Signed and sealed this 6th day of May 1975.

(SEAL)
Attest:

RUTH C. MASON
Attesting Officer

C. MARSHALL DANN
Commissioner of Patents
and Trademarks